(12) United States Patent
Locke

(10) Patent No.: US 10,718,132 B1
(45) Date of Patent: Jul. 21, 2020

(54) SHELTER COVER

(71) Applicant: Carl Locke, Fort Worth, TX (US)

(72) Inventor: Carl Locke, Fort Worth, TX (US)

( * ) Notice: Subject to any disclaimer, the term of this patent is extended or adjusted under 35 U.S.C. 154(b) by 0 days.

(21) Appl. No.: 16/210,874

(22) Filed: Dec. 5, 2018

(51) Int. Cl.
| | |
|---|---|
| *E04H 15/58* | (2006.01) |
| *E04H 9/14* | (2006.01) |
| *A47K 3/00* | (2006.01) |
| *G08B 7/06* | (2006.01) |
| *G08B 5/36* | (2006.01) |
| *C08B 3/10* | (2006.01) |

(52) U.S. Cl.
CPC ............. *E04H 15/58* (2013.01); *A47K 3/001* (2013.01); *E04H 9/14* (2013.01); *G08B 7/064* (2013.01); *C08B 3/10* (2013.01); *G08B 5/36* (2013.01)

(58) Field of Classification Search
CPC ........... E04H 14/58; E04H 9/14; E04H 15/58; A47K 3/001; G08B 7/064
USPC .................................................... 4/546, 580
See application file for complete search history.

(56) References Cited

U.S. PATENT DOCUMENTS

| | | | | |
|---|---|---|---|---|
| 3,119,122 A | * | 1/1964 | Weisbeck ............... | A61H 33/10 4/580 |
| 3,837,014 A | * | 9/1974 | Sugiyama ............... | A61H 33/10 4/534 |
| 4,152,792 A | * | 5/1979 | Glintz .................... | A47K 3/022 4/300 |
| 4,765,000 A | * | 8/1988 | Currie .................... | A47K 3/001 4/524 |
| 9,879,473 B1 | * | 1/2018 | Little ...................... | E06B 5/003 |
| 2006/0236450 A1 | * | 10/2006 | Shanks ................... | A47K 3/001 4/580 |

* cited by examiner

*Primary Examiner* — Huyen D Le
(74) *Attorney, Agent, or Firm* — Law Office of Jeff Williams PLLC; J. Oliver Williams

(57) ABSTRACT

A shelter cover for a bathtub includes a hood, a guide, a fastener, a controller and indicator. The hood has a lower surface that extends about its periphery. The hood forming a concave body. The guide is coupled to either an interior surface or an exterior surface of the hood and extends below the lower surface. The fastener is in communication with either the hood or the guide to selectively couple the concave body to the bathtub. An interior handle is located on the interior surface of the concave body. The controller is coupled to the concave body and is in communication with the indicator. The indicator indicates the presence of a person inside the concave body to an individual exterior to the bathtub and concave body. The controller regulates operation of the indicator.

19 Claims, 2 Drawing Sheets

SHELTER COVER

BACKGROUND

1. Field of the Invention

The present invention is related to shelters, specifically a shelter cover to be placed over a bathtub to provide personal protection from extreme weather or disaster.

2. Description of Related Art

Events causing structural damage, such as severe weather or earthquake, require steps to protect people inside the structure. For example, in areas frequented by tornadoes, underground shelters or shelters in the basement are the best protection from flying debris. However, not all structures have below grade areas available. Examples include homes built on concrete slabs and multi-story apartment buildings. In these cases, occupants must seek an interior space for protection. Interior spaces may be reinforced using steel or prefabricated steel boxes to accommodate one or more people. However, these are expensive and permanent additions to the structure.

It is desired that a system be developed that is an alternative to high cost, permanent structure modification. The system and method being designed for temporary installation and lower cost yet provides significant protection from severe weather.

SUMMARY OF THE INVENTION

An object of the present invention relates to a storm cover which can be placed on top of a bathtub to providing a safer area for an occupant within the bathtub.

A shelter cover comprising a hood having a lower surface, and a guide coupled to the hood, wherein the guide extends below the lower surface, wherein the hood extends about the entire periphery of the lower surface opposite the guide so as to form a concave body. The hood may be curved to increase an interior volume of the concave body. The hood may also be corrugated to increase the strength of the shelter cover.

The shelter cover may be further comprised of a fastener, wherein the fastener couples the hood to a bathtub. The fastener can be fastened from inside or outside the concave body. The fastener can be released from either inside or outside the concave body.

The shelter cover may be further comprised of an interior handle located on an interior surface of the concave body.

The shelter cover may be further comprised of an exterior handle located on an exterior surface of the concave body.

The shelter cover may be further comprised of an indicator coupled to the concave body and configured to indicate the presence of a person inside the concave body. The indicator may be a light emitting device, a sound emitting device, and/or a radio wave transmitting device.

The more important features of the invention have thus been outlined in order that the more detailed description that follows may be better understood and to ensure that the present contribution to the art is appreciated. Additional features of the system will be described hereinafter and will form the subject matter of the claims that follow.

Many objects of the present invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The assembly is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present system. It is important, therefore, that the claims be regarded as including such equivalent constructions insofar as they do not depart from the spirit and scope of the present invention.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
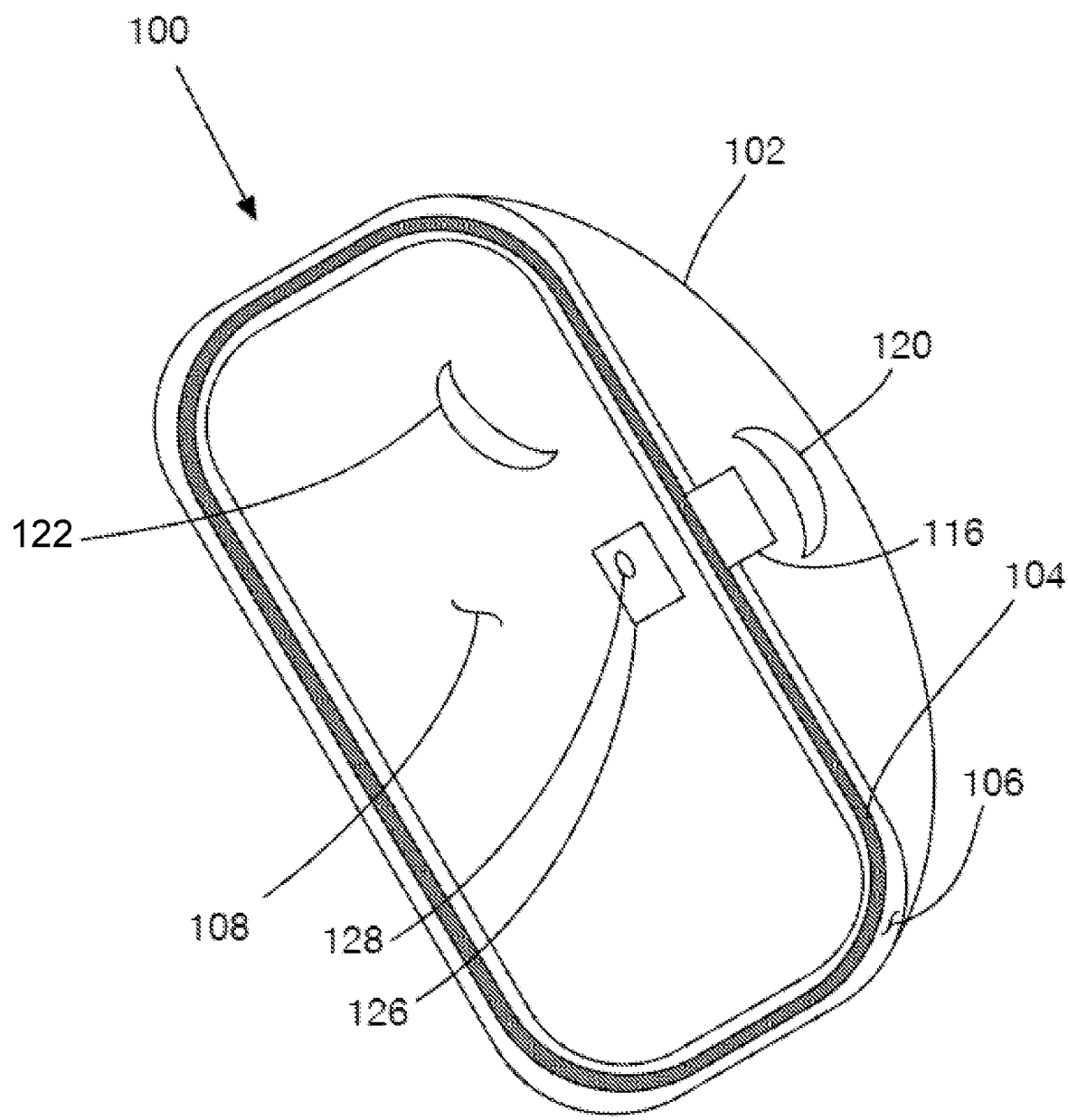
FIG. 1 is a lower perspective view of a shelter cover according to an embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The assembly and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The assembly and method of the present application is illustrated in the associated drawings. The assembly includes a shelter cover for a bathtub that has a hood, a guide, a fastener, a controller and an indicator. The hood has a lower surface that extends about its periphery. The hood forms a concave body. The guide is coupled to either an interior surface or an exterior surface of the hood and extends below the lower surface. The fastener is in communication with either the hood or the guide to selectively couple the concave body to the bathtub. An optional interior handle is located on the interior surface of the concave body. The controller is coupled to the concave body and is in communication with the indicator. The indicator indicates the presence of a person inside the concave body to an individual exterior to the bathtub and concave body. The controller regulates operation of the indicator. Additional features and functions of the device are illustrated and discussed below.

Referring now to the Figures wherein like reference characters identify corresponding or similar elements in form and function throughout the several views. The following Figures describe the assembly of the present application and its associated features. With reference now to the Figures, an embodiment of the modular observation assembly and method of use are herein described. It should be noted that the articles "a", "an", and "the", as used in this specification, include plural referents unless the content clearly dictates otherwise.

The present invention relates to shelters, specifically a shelter cover to be placed over a bathtub to provide personal protection from extreme weather or disaster. Referring to FIG. 1, shelter cover 100 comprises a hood 102 and a guide 104. Hood 102 has a lower surface 106 and guide 104, coupled to the lower surface 106, extends below the lower surface 106. Hood 102 extends about the periphery of the lower surface 106, opposite the guide 104, such that a concave body 108 is formed. Concave body 108 may be curved or corrugated to strengthen hood 102 against exterior forces as well as provide headroom for a shelter occupant. Materials suitable for hood 102 may include high impact plastic, composite carbon fiber or aluminum, to name a few.

Guide 104 locates hood 102 on a bathtub such that the bathtub is covered by shelter cover 100. Guide 104 is coupled to at least one of an interior surface and an exterior surface of the hood and extends below lower surface 106. An example of guide 104 may be a lip extending below a rim (interior or exterior) of the top of the bathtub, preventing hood 102 from moving laterally. Guide 104 may be continuous around the periphery of lower surface 106 or may be located in one or more discreet locations around lower surface 106. Suitable material for guide 104 may be the same material as hood 102 or it may be another material, some examples of which are rubber, nylon or plastic.

Figure 2:
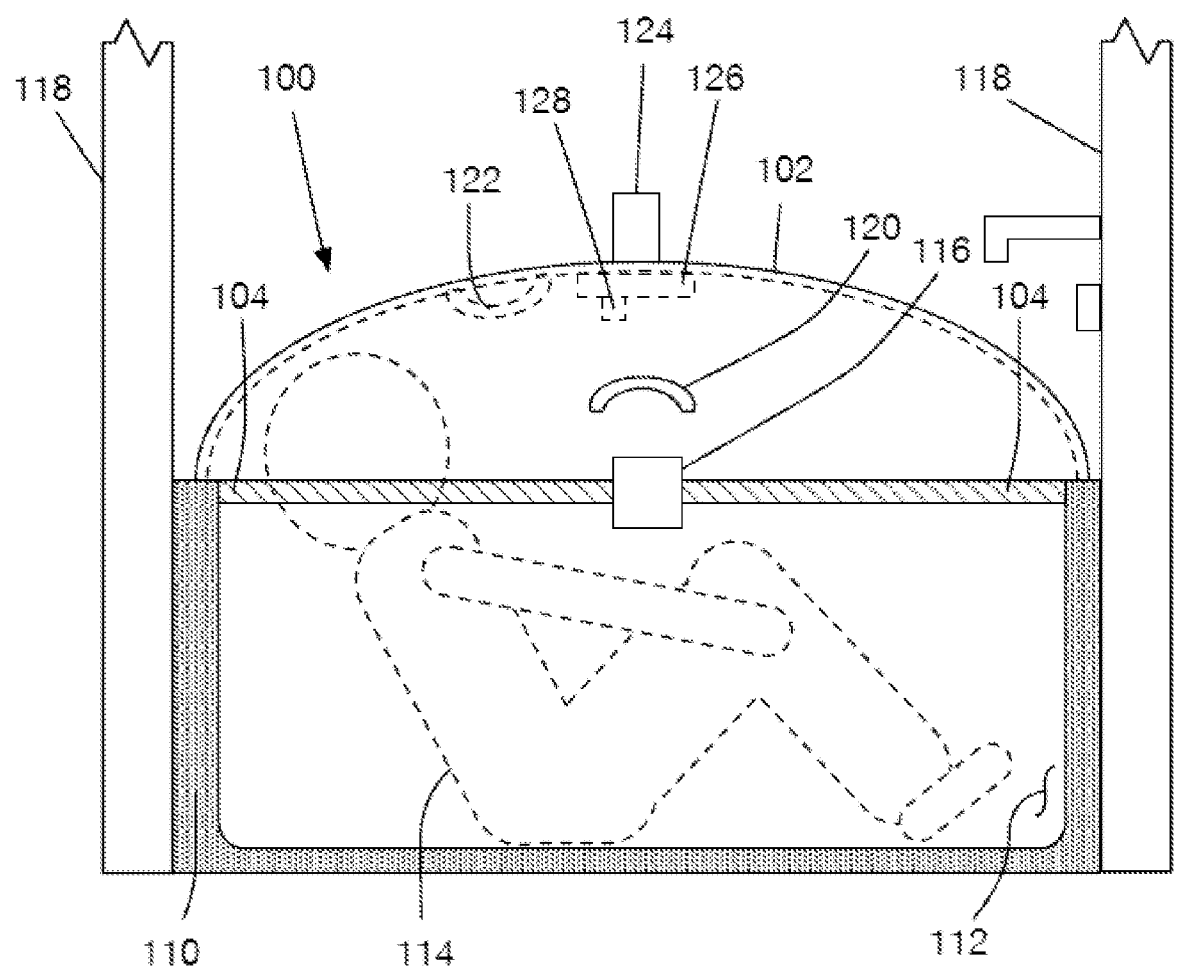
FIG. 2 is a side view of the shelter cover of FIG. 1, placed on top of a bathtub to form a storm shelter.

Referring to FIG. 2, shelter cover 100 is coupled to a bathtub 110. The volume enclosed by the shelter cover 100 and an interior surface 112 of bathtub 110 is the shelter interior volume used by an occupant 114.

Referring now to both FIG. 1 and FIG. 2, shelter cover 100 further comprises a fastener 116 located on hood 102. Fastener 116 couples hood 102 to a bathtub 110 without marring or causing permanent damage to the surface of bathtub 110. One or more fasteners 116 may be used. Some examples of fastener 116 include suction cup, a hook type drawbolt that uses a contour of the bathtub to attach to, or a tension rod that extends out laterally to press against a wall 118 (when mounted partially externally) or bathtub interior surface 112 (when mounted fully within the shelter interior). Other types of fasteners are well known in the art and may be used as appropriate.

Fastener 116 may be accessed from the interior of hood 102 by occupant 114 to fasten and release fastener 116. Fastener 116 may also be accessed from the shelter exterior to release fastener 116 in the event occupant 114 is unable to do so. A removable panel or small hatch may be positioned about hood 102 to permit access to an interior operated fastener 116 from an exterior position. Th panel may be lockable with access granted from the exterior of hood 102.

Shelter cover 100 further comprises an exterior handle 120, located on the exterior surface 106 of hood 102. Exterior handle 120 may be coupled to hood 102 or may be integrally molded into hood 102. Exterior handle 120 is provided to carry the hood 102 and place it over bathtub 110 or lift hood 102 from the bathtub.

Shelter cover 100 further comprises an interior handle 122. Interior handle 122 is located on the inside, or concave side, of hood 102. Interior handle 122 may be used by occupant 114 to pull hood 102 down onto the bathtub 110 and aid in coupling hood 102 to bathtub 110 with fastener 116.

Shelter cover 100 may further comprise an indicator 124, configured to identify to others outside the shelter that occupant 114 is inside. Indicator 124 may be a light, an audio transducer, a radio transmitter, a near field communication device or any other appropriate device designed to attract attention. Indicator 124 is electrically coupled to an electronic controller 126, located on the interior surface 108 of hood 102. Electronic controller 126 may comprise a control 128 to activate indicator 124 or alternatively electronic controller 126 may sense the presence of occupant 114 and automatically activate indicator 124. Examples of control 128 may be a switch, a microphone, or a movement detector. Controller 126 is a conventional electronic device configured with a set of circuitry sufficient to operate one or more sensors and/or switches. A power supply is located within controller 126 to selectively provide power to indicator 124 as control 128 is operated, or a sensor of controller 126 automatically detects the presence of occupant 114.

Shelter cover 100 may be stored above bathtub 110, ready for use.

Alternatively, shelter cover 100 may be stored in a closet or another room and carried to bathtub 110 upon the occurrence of an emergency situation. Ropes, pulleys or motors are may also be used to control the movement of shelter cover 100 above bathtub 110 in selected environments. For convenience or storage, hood 102 may comprise 2 or more sections able to be quickly assembled or folded.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A shelter cover for a bathtub, the bathtub having a rim, comprising:
    a detachable hood having a lower surface, the lower surface configured to rest upon the rim of the bathtub; and
    a guide coupled to the hood, wherein the guide extends around a periphery of the hood below the lower surface so as to engage at least one of an exterior surface and an interior surface of the rim to prevent lateral movement of the hood, the guide engaging the entire rim of the bathtub;
    wherein the hood extends about the periphery of the lower surface opposite in direction from the guide so as to form a concave body.

2. The shelter cover of claim 1, wherein the hood is curved to increase an interior volume of the concave body.

3. The shelter cover of claim 1, further comprising:
    a fastener in communication with a surface of at least one of the hood and the guide the hood, the fastener selectively couples the concave body to a bathtub.

4. The shelter cover of claim 3, wherein the fastener can be fastened from inside the concave body.

5. The shelter cover of claim 3, wherein the fastener can be fastened from an exterior of the concave body.

6. The shelter cover of claim 3, wherein the fastener can be released an exterior of the concave body.

7. The shelter cover of claim 3, wherein the fastener can be released from inside the concave body.

8. The shelter cover of claim 1, further comprising:
    an interior handle located on an interior surface of the concave body.

9. The shelter cover of claim 1, further comprising an exterior handle located on an exterior surface of the concave body.

10. The shelter cover of claim 1, further comprising an indicator coupled to the concave body and configured to indicate the presence of a person inside the concave body.

11. The shelter cover of claim 10, wherein the indicator is a light emitting device.

12. The shelter cover of claim 10, wherein the indicator is a sound emitting device.

13. The shelter cover of claim 10, wherein the indicator is a radio wave emitting device.

14. The shelter cover of claim 10, wherein the indicator is activated automatically via a controller as the presence of an occupant is detected.

15. The shelter cover of claim 10, wherein the indicator is activated manually through operation of a switch in communication with a controller and the indicator.

16. A removable shelter cover for covering a bathtub with a rim, comprising:
    a hood having a lower surface that extends about its periphery, the hood forming a concave body;
    a guide coupled to at least one of an interior surface and an exterior surface of the hood, wherein the guide extends below the lower surface around the periphery of the hood, the guide contacting at least one of an exterior surface and an interior surface of the rim of the bathtub around the periphery to prevent lateral movement of the hood, the guide engaging the entire rim of the bathtub;
    a fastener in communication with at least one of the hood and the guide, the fastener configured to selectively couple the concave body to the bathtub;
    an interior handle located on the interior surface of the concave body;
    a controller coupled to the interior surface of the concave body; and
    an indicator coupled to the concave body and configured to indicate the presence of a person inside the concave body to an individual exterior to the bathtub and concave body, the indicator in communication with the controller such that the controller regulates operation of the indicator.

17. The shelter cover of claim 16, wherein the indicator is at least one of a light emitting device, a sound emitting device, and a radio wave emitting device.

18. The shelter cover of claim 16, wherein the indicator is activated automatically via the controller as the presence of an occupant is detected.

19. A method of sheltering a person within a bathtub, comprising:
    moving a hood to the bathtub, the hood forming a concave body with a lower surface about its periphery;
    locating the hood over the bathtub using a guide, the guide coupled to at least one of an interior surface and an exterior surface of the hood and extending around the periphery of the hood, wherein the guide extends below the lower surface to engage at least one of an exterior surface and an interior surface of a rim of the bathtub so as to prevent lateral movement;
    coupling the hood to the bathtub with a fastener, the fastener in communication with at least one of the hood and the guide, the hood including a handle on the interior surface for an occupant to grasp; and
    indicating the presence of a person under the hood when the hood is located on the bathtub via an indicator coupled to the concave body, the indicator and configured to indicate the presence of a person inside the concave body to an individual exterior to the bathtub and concave body, the indicator in communication with a controller within the concave body, such that the controller regulates operation of the indicator.

* * * * *